Patented Oct. 12, 1954

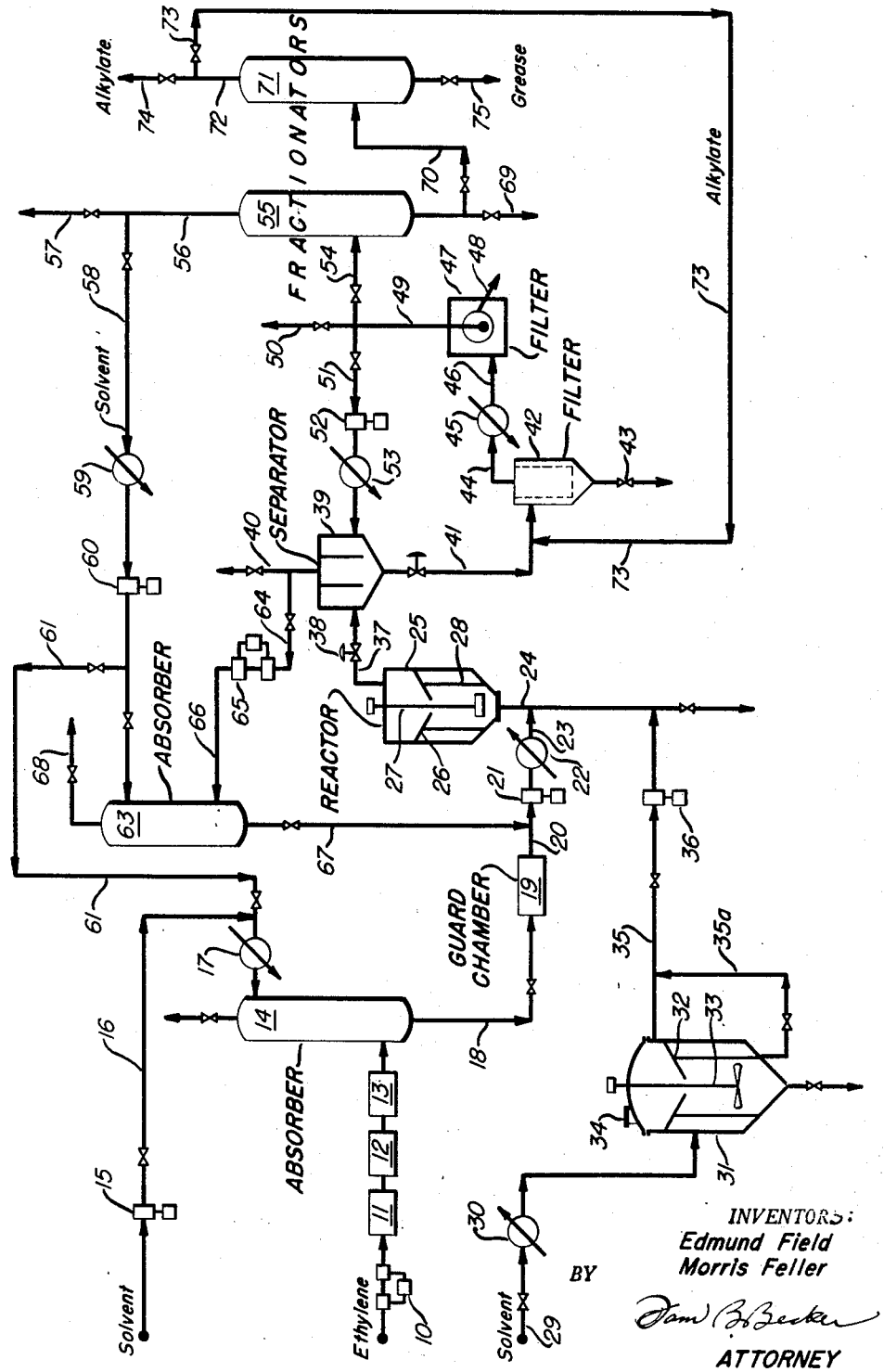

2,691,647

UNITED STATES PATENT OFFICE 2,691,647

CONVERSION OF ETHYLENE AND/OR PROPYLENE TO SOLID POLYMERS IN THE PRESENCE OF GROUP 6a METAL OXIDES AND ALKALI METALS

Edmund Field and Morris Feller, Chicago, Ill., assignors to Standard Oil Company, Chicago, Ill., a corporation of Indiana Application December 6, 1952, Serial No. 324,610

29 Claims. (Cl. 260—88.1)

This invention relates to a novel polymerization process and to novel polymerization products produced thereby. In a more specific aspect, this invention relates to a novel process for the polymerization of ethylene, propylene or their mixtures in the presence of an alkali metal and a solid catalytic material containing an oxide of a metal of Group 6a (left hand subgroup of Group 6) of the Mendeleef Periodic Table, viz. one or more of the oxides of Cr, Mo, W or U.

One object of our invention is to provide novel and highly useful catalysts for the preparation of high molecular weight polymers from ethylene-containing gas mixtures. Another object is to provide a process of ethylene polymerization in which the yields of solid polymer are greatly increased, as compared with the yields heretofore obtainable solely by the use of subhexavalent oxides of Group 6a metals. Another object is to provide a novel process for the polymerization of ethylene to high molecular weight normally solid polymers. Still another object of our invention is to provide a novel process for the conversion of gas mixtures comprising essentially ethylene to high molecular weight solid resinous or plastic materials.

A further object is to provide a relatively low temperature, low pressure process for the conversion of ethylene-containing gases to high molecular weight resinous or plastic materials. An additional object of the present invention is to provide a process for the copolymerization of ethylene with other polymerizable materials, particularly with a normally gaseous mono-olefin such as propylene, to provide novel resinous materials. These and other objects of our invention will become apparent from the ensuing description thereof.

Briefly, the inventive process comprises the conversion of ethylene principally to high molecular weight normally solid polymers by contact with an alkali metal and one or more of the oxides of chromium, molybdenum, tungsten or uranium, for example, a partially reduced molybdenum trioxide extended upon a support. While we prefer to employ the alkali metals as such, we can employ various alloys or alloy-like compounds thereof, e. g., the various alkali metal silicides. The inventive process is effected at temperatures between about 75° C. and about 325° C., preferably between about 130° C. and 260° C., and pressures between about atmospheric and 15,000 p. s. i. g. or higher, preferably between about 200 and 5000, or about 1000 p. s. i. g. The normally solid materials produced by the catalytic conversion tend to accumulate upon and within the solid catalyst. It is desirable to supply to the reaction zone a liquid medium which serves both as a reaction medium and a solvent for the solid reaction products. Suitable liquid reaction media for ethylene polymerization include various hydrocarbons, particularly an aromatic hydrocarbon such as benzene, toluene or xylenes. For the polymerization of propylene, less readily alkylatable reaction media such as cycloparaffins, e. g., cyclohexane or decalin, or paraffins, e. g., iso-octane, are preferred. However, the conversion of ethylene- or propylene-containing gas streams can be effected in the absence of a liquid reaction medium or solvent and the catalyst containing accumulated solid polymeric conversion products can be treated from time to time, within or outside the conversion zone, to effect removal of conversion products therefrom and, if necessary, reactivation or regeneration of the catalyst for further use.

The practice of the process of the present invention leads to ethylene homopolymers, propylene polymers and ethylene-propylene copolymers of widely variant molecular weight ranges and attendant physical and mechanical properties, dependent upon the selection of operating conditions. The inventive process is characterized by extreme flexibility both as regards operating conditions and as regards the products producible thereby. Thus the present process can be effected over extremely broad ranges of temperature and pressure. The practice of the present process can lead to grease-like ethylene homopolymers having an approximate molecular weight range of 300 to 700, wax-like ethylene homopolymers having an approximate specific viscosity ($\times 10^5$) between about 1000 and 10,000 and tough, resinous ethylene homopolymers having an approximate specific viscosity ($\times 10^5$) of 10,000 to more than 300,000 [($\eta$ relative $-1$)$\times 10^5$]. By the term "tough, resinous polyethylene" as used in the present specification and claims, we mean polymer having a brittle point below $-50°$ C. (A. S. T. M. Method D746—51T), impact strength greater than two foot pounds per inch of notch (A. S. T. M. Method D256—47T—Izod machine) and minimum elongation at room temperature (25° C.) of 100%.

The process of the present invention can be employed to effect the copolymerization of ethylene with other polymerizable materials and particularly with propylene. Propylene alone has been polymerized, by the employment of catalysts of the present invention to a solid polymer. Other polymerizable materials include mono-olefinic hydrocarbons such as n-butylenes, isobutylene, t-butylethylene, and the like, usually in proportions between about 1 and about 25% by weight, based on the weight of ethylene.

An important feature of the present invention is the conjoint employment of a Group 6a metal oxide catalyst and an alkali metal, viz., lithium, sodium, potassium, rubidium or cesium. We may employ mixtures of the alkali metals, e. g., sodium-potassium eutectic or alloys comprising alkali metals. The employment of an alkali metal in the reaction zone has numerous important practical consequences, as compared to processes wherein said metal oxide catalysts are employed without alkali metals. Thus, in the presence of both alkali metal and metal oxide catalysts, high yields of solid polymers can be obtained from ethylene, the metal oxide catalyst can function well in the presence of large proportions of liquid reaction medium, the metal oxide catalyst retains strong polymerization activity for a long period of time (long catalyst life), polymers having desirable ranges of physical and chemical properties can be readily produced by controlling the reaction variables, etc., as will appear from the detailed description and operating examples which follow.

The function or functions of the alkali metal in our process are not well understood. The alkali metals alone are not catalysts for the polymerization of ethylene or propylene to yield high molecular weight, normally solid polymers under the conditions described herein. Yet, the alkali metals promote the action of the group 6a metal oxide catalysts to increase the productivity (polymer yield) of said catalysts, sometimes prodigiously. It might be assumed that alkali metals function merely to react with catalyst poisons which might be present in small proportions of the order of a few parts per million in ethylene, propylene and/or in the liquid reaction medium; we have found, however, that even extremely pure ethylene or propylene and liquid reaction medium which have been contacted with alkali metal under reaction conditions and directly thereafter contacted in a separate zone with a molybdenum oxide catalyst do not produce solid polymer in the high yields or quality which can be attained by the process of the present invention.

We have further discovered that alkali metal so activates molybdenum oxide catalysts that we were enabled, the first time to our knowledge, to obtain solid polymers by contacting ethylene with $MoO_3$ alone, i. e., without a support which functions greatly to increase the surface area upon which $MoO_3$ is extended. Another surprising and unexpected effect is that ethylene can be converted to normally solid polymers by contacting it with alkali metal and a solid oxide catalyst in which the group 6a metal is initially present in the form of a trioxide rather than as a subhexavalent group 6a metal oxide, which is essential when no alkali metal is employed in the reaction zone. Prior to our invention, subhexavalent molybdenum oxides were known to be catalysts for the polymerization of ethylene to form normally-solid polymers only when supported upon the three difficultly reducible metal oxides: gamma-alumina, titania, zirconia. In the presence of alkali metals, the group 6a metal oxide catalysts can be employed not only on alumina, titania or zirconia supports but also on a great variety of other supports for the polymerization of ethylene and/or propylene to form normally solid polymers, e. g., silica supports such as silica gel, kieselguhr, diatomite; silica-alumina, aluminosilicates, such as various clays and bleaching earths; and even adsorptive carbon, which is however not preferred. In a practical process, it is preferable to furnish a difficultly reducible metal oxide for the group 6a metal oxide catalyst, e. g. gamma-alumina.

The proportion of alkali metal employed can be varied from about 0.001 to about 2 parts by weight per part by weight of the metal oxide catalyst (total weight of solid catalyst). The promoting activity of the metals increases with increasing atomic weight. The optimum proportions can readily be determined in specific instances, by simple small-scale tests with the specific feed stocks, liquid reaction medium, reaction medium: catalyst ratio, catalyst, temperature, pressure and nature of the product which is desired. Usually sodium is employed in proportions between about 0.01 and about 2 parts by weight per part by weight of molybdenum catalyst at ratios between about 5 and about 3000 volumes or more of liquid medium per part by weight of metal oxide catalyst.

The relative proportions of support to the catalytic metal oxide is not critical and may be varied throughout a relatively wide range such that each component is present in amounts of at least approximately 1 weight percent. The usual metal oxide-support ratios are in the range of about 1:20 to 1:1, or approximately 1:10. We employ conditioned alumina-metal oxide catalysts composed of gamma-alumina base containing about 1 to 80%, preferably about 5 to 35%, or approximately 10%, of catalytic metal oxide supported thereon.

Gamma-alumina, titania and zirconia supports for our catalysts may be prepared in any known manner and the oxides of molybdenum or other group 6a metal may likewise be incorporated in, or deposited on, the support in any known manner, e. g. as described in copending Serial No. 223,641 of Alex Zletz and Serial No. 223,643 of Alan K. Roebuck and Alex Zletz, both filed on April 28, 1951. Excellent results have been obtained with molybdena-alumina, chromia-alumina and tungstia-alumina which can be catalysts of the type employed for effecting hydroforming, the word "hydroforming" being employed to mean processes of the type described in U. S. Letters Patent 2,320,147, 2,388,536, 2,357,-332, etc.

The molybdena or other molybdenum-oxygen compound, such as cobalt molybdate, may be incorporated in the catalyst base in any known manner, e. g. by impregnation, coprecipitation, co-gelling, and/or absorption, and the catalyst base and/or finished catalyst may be seat-stabilized in the known manners heretofore employed in the preparation of hydroforming or hydrofining catalysts. Cobalt molybdate catalysts may be prepared as described in U. S. 2,393,288, 2,486,-361, etc. Cobalt, calcium, nickel and copper salts of chromic, tungstic and uranic acids may also be employed, with or without a support.

The catalyst may be stabilized with silica (U. S. 2,437,532-3) or with aluminum ortho-phosphate (U. S. 2,440,236 and 2,441,297) or other known stabilizers or modifiers. The catalyst may contain calcium oxide (U. S. 2,422,172 and 2,447,043) or the base may be in the form of a zinc aluminate spinel (U. S. 2,447,016) and it may contain appreciable amounts of zirconia or titania (U. S. 2,437,531-2). Oxides of other metals such as magnesium, nickel, zinc, vanadium, thorium, iron, etc., may be present in minor amounts, below 10 weight per cent of the total catalyst.

Although, as stated above, no reducing treatment need be effected on the metal oxide catalysts when they are employed in the presence of alkali metal, a reducing or conditioning treatment is preferred in commercial processing. The conditioning or reducing treatment of the hexavalent group 6a metal oxide is preferably effected with hydrogen, although other reducing agents such as carbon monoxide, mixtures of hydrogen and carbon monoxide (water gas, synthesis gas, etc.), sulfur dioxide, hydrogen sulfide, dehydrogenatable hydrocarbons, etc., may be employed. Hydrogen can be employed as a reducing agent at temperatures between about 350° C. and about 850° C., although it is more often employed at temperatures within the range of 450° C. to 650° C. The hydrogen partial pressure in the reduction or conditioning operation may be varied from subatmospheric pressures, for example even 0.1 pound (absolute) to relatively high pressures up to 3000 p. s. i. g., or even more. The simplest reducing operation may be effected with hydrogen simply at about atmospheric pressure.

The partial reduction of the metal oxide catalyst in which the metal is present in its hexavalent state can be effected in the presence of the alkali promoter prior to contacting the combination of catalysts with ethylene. We have at times observed that an induction period before ethylene polymerization can be eliminated or substantially reduced by pressuring hydrogen into the reactor containing the solvent, ethylene, metal oxide catalyst and alkali metals, e. g. at hydrogen pressures between about 10 and about 900 p. s. i. g., preferably 100–400 p. s. i. g.; under these conditions a small proportion of the ethylene is reduced to ethane.

Lithium aluminum hydride, an exceptionally active reducing agent, conditions and activates catalysts containing hexavalent group 6a metal oxides even at temperatures as low as 35° C., although in general temperatures between about 100 and about 300° C. are employed. In practice, for example, a catalyst containing free or chemically combined $MoO_3$ (e. g., combined as in $CoMoO_4$) is treated with a suspension of $LiAlH_4$ in a liquid hydrocarbon solvent at weight ratios of about 0.01 to about 1 $LiAlH_4$ per weight of solid catalyst. Sodium hydride (or sodium plus $H_2$) is effective in reducing and conditioning hexavalent group 6a metal oxide catalysts such as $MoO_3$ at temperatures above about 180° C. and can be employed in the same proportions as $LiAlH_4$.

The conditioning and reducing treatment of the group 6a metal oxide can be followed and controlled by analysis with ceric sulfate-sulfuric acid solution, by means of which the average valence state of the molybdenum or other metal oxide in the catalyst can be accurately determined. In determining the average valence state of metals such as molybdenum in catalysts such as partially reduced $MoO_3$ supported on difficultly reducible metal oxides such as gamma-alumina, it is necessary to know the total molybdenum content and the number of milliequivalents of a standard oxidation reagent required to reoxidize the partially reduced molybdena to $MoO_3$. A suitable oxidation procedure consists in weighing out approximately one gram of finely-ground, freshly-reduced catalyst into a glass-stoppered 250-ml. Erlenmeyer flask and adding 25 ml. of 0.1 N ceric sulfate solution and 25 ml. of 1:1 sulfuric acid. This mixture is allowed to stand at room temperature for four days with frequent agitation. This interval was arbitrarily chosen initially but was later shown to be more than sufficient time for the oxidation to take place. The solid residue is then filtered off and the excess ceric solution determined by addition of excess standard ferrous solution which is in turn titrated with standard ceric solution using ferrous-orthophenanthroline as the indicator. Total molybdenum in the sample is determined by dissolving the sample in a sulfuric acid-phosphoric acid solution, reducing the molybdenum in a Jones reductor, catching the reduced solution in ferric alum, and titrating the resulting ferrous ion with standrd ceric sulfate solution. From the values obtained, the oxidation state of molybdenum can be determined.

The partial reduction of the molybdena or other group 6a metal trioxide is carried out to the extent that the average valence state of the catalytic metal in the catalyst lies within the range of about 5.5 to about 2, preferably between about 3.0 and about 5.0.

The conditioning treatment hereinabove described is required not only for fresh catalyst, but is also required for catalyst which has become relatively inactive in the polymerization step. As will be hereinafter described, the polymer formed in the polymerization reaction must be continuously or intermittently removed from the catalyst particles, preferably by means of solvents, and it is usually necessary or desirable to condition a catalyst surface which has been thus freed to some extent from polymer before it is again employed for effecting polymerization. When catalyst can no longer be rendered sufficiently active by simple removal of polymer and conditioning with a reducing gas as hereinabove described, it may be regenerated by extraction with water, ammonium salts or dilute aqueous acids, thereafter burning combustible deposits therefrom with oxygen followed by the conditioning step. Detoxification of the catalysts by treatment with dilute aqueous solutions of per-acids such as permolybdic, pervanadic or pertungstic acids may be practiced, followed by hydrogen-conditioning of the catalysts.

The catalysts can be employed in various forms and sizes, e. g., as powder, granules, microspheres, broken filter cake, lumps, or shaped pellets. A convenient form in which the catalysts may be employed is as granules of about 20–100 mesh/inch size range.

The charging stock to the present polymerization process preferably comprises essentially ethylene. The ethylene charging stocks may contain hydrogen and hydrocarbons, as in refinery gas streams, for example, methane, ethane, propane, etc. However, it is preferred to employ as pure and concentrated ethylene charging stocks as it is possible to obtain. When the charging stock contains propylene as well as ethylene, both these olefins may contribute to the production of resinous high molecular weight products.

It is desirable to minimize or avoid the introduction of oxygen, carbon dioxide, water or sulfur compounds into contact with the catalyst.

In general, polymerization can be effected in the present process at temperatures between about 75° C. and about 325° C. Usually polymerization is effected in the present process at temperatures between about 110° C. and about 275° C. or the preferred narrower range of about 220 to about 260° C. The conjoint use of polymerization temperatures between about 230 and about 260° C. and a liquid hydrocarbon reaction medium such as benzene, xylenes, decalin or methyl decalins is highly desirable in producing ethylene polymers having specific viscosities ($\times 10^5$) ranging on the average from about 10,000 to about 30,000 in continuous operations with relatively long on-stream periods and active catalysts.

It has been found that the present process can be employed for the production of relatively high molecular weight ethylene hetero- and homo-polymers at relatively low pressures. The process of the present invention can be effected to some extent even at atmospheric pressure. The upper limit of the partial pressure of ethylene in the process is dictated by economic considerations and equipment limitations and may be 10,000 p. s. i. g., 20,000 p. s. i. g., or even more. A generally useful and economically desirable ethylene pressure range is between about 200 and about 5000 p. s. i. g., preferably between about 500 and about 1500 p. s. i. g., e. g. about 1000 p. s. i. g.

The contact time or space velocity employed in the polymerization process will be selected with reference to the other process variables, catalysts, the specific type of product desired and the extent of ethylene conversion desired in any given run or pass over the catalyst. In general, this variable is readily adjustable to obtain the desired results. In operations in which the ethylene charging stock is caused to flow continuously into and out of contact with the solid catalyst, suitable liquid hourly space velocities are usually between about 0.1 and about 10 volumes, preferably about 0.5 to 5 or about 2 volumes of ethylene solution in a liquid reaction medium, which is usually an aromatic hydrocarbon such as benzene, xylenes or tetralin, or a cycloaliphatic hydrocarbon, such as decalin (decahydronaphthalene). The amount of ethylene in such solutions may be in the range of about 2 to 50% by weight, preferably about 2 to about 10 weight percent or, for example, about 5 to 10 weight percent. We have observed that when the ethylene concentration in the liquid reaction medium is decreased below about 2 weight percent, the molecular weight and melt viscosity of the polymeric products drop sharply. The rate of ethylene polymerization tends to increase with increasing concentration of the ethylene in the liquid reaction medium. However, the rate of ethylene polymerization to form high molecular weight, normally solid polymers must not be such as to yield said solid polymers in quantities which substantially exceed the solubility thereof in said liquid reaction medium under the reaction conditions, usually up to about 5-7 weight percent, exclusive of the amounts of polymeric products which are selectively adsorbed by the catalyst. Although ethylene concentrations above 10 weight percent in the liquid reaction medium may be used, solutions of ethylene polymer above 5-10% in the reaction medium become very viscous and difficult to handle and severe cracking or spalling of the solid metal oxide catalyst particles or fragments may occur, resulting in catalyst carry-over as fines with the solution of polymerization products and extensive loss of catalyst from the reactor.

In batch operations, operating periods of between about one-half and about 10 hours, usually between about 1 and about 4 hours, are employed and the reaction autoclave is charged with ethylene as the pressure falls as a result of the ethylene conversion reaction.

The solvent:catalyst weight ratio can be varied in the range of about 5 to about 3000, or even higher for flow systems. The employment of very high solvent:catalyst ratios, which is rendered possible by the presence of an alkali metal in the reaction zone, is very important in obtaining high yields of polymer.

Ethylene can be polymerized in the gas phase and in the absence of a liquid reaction medium by contact with alkali metal and group 6a metal oxide catalysts. Upon completion of the desired polymerization reaction it is then possible to treat the solid catalyst for the recovery of the solid polymerization products, for example by extraction with suitable solvents. However, in the interests of obtaining increased rates of ethylene conversion and of continuously removing solid conversion products from the catalyst, it is desirable to effect the conversion of ethylene in the presence of suitable liquid reaction media. The liquid reaction medium may also be employed as a means of contacting the ethylene with catalyst by preparing a solution of ethylene in the liquid reaction medium and contacting the resultant solution with the polymerization catalyst.

The liquid reaction medium functions as a solvent to remove some of the normally solid product from the catalyst surface.

Various classes of hydrocarbons or their mixtures which are liquid and substantially inert under the polymerization reaction conditions of the present process can be employed. Members of the aromatic hydrocarbon series, particularly the mononuclear aromatic hydrocarbons, viz., benzene, toluene, xylenes, mesitylene and xylene-p-cymene mixtures can be employed. Tetrahydronaphthalene can also be employed. In addition, we may employ such aromatic hydrocarbons as ethylbenzene, isopropylbenzene, n-propylbenzene, sec-butylbenzene, t-butylbenzene, ethyltoluenes, ethylxylenes, hemimellitene, pseudocumene, prehnitene, isodurene, diethylbenzenes, isoamylbenzene and the like. Suitable aromatic hydrocarbon fractions can be obtained by the selective extraction of aromatic naphthas, from hydroforming operations as distillates or bottoms, from cycle stock fractions of cracking operations, etc.

We may also employ certain alkyl naphthalenes which are liquid under the polymerization reaction conditions, for example, 1-methylnaphthalene, 2-isopropylnaphthalene, 1-n-amylnaphthalene and the like, or commercially produced fractions containing these hydrocarbons.

Certain classes of aliphatic hydrocarbons can also be employed as a liquid hydrocarbon reaction medium in the present process. Thus, we may employ various saturated hydrocarbons (alkanes and cycloalkanes) which are liquid under the reaction conditions. Either pure alkanes or cycloalkanes or commercially available mixtures, freed of catalyst poisons, may be employed. For example, we may employ straight run naphthas or kerosenes containing alkanes and cycloalkanes. Specifically, we may employ liquid or liquefied alkanes such as n-pentane, n-hexane, 2,3-dimethylbutane, n-octane, iso-octane (2,2,4-trimethylpentane), n-decane, n-dodecane, cyclohexane, methylcyclohexane, dimethylcyclopentane, ethylcyclohexane, decalin, methyldecalins, dimethyldecalins and the like.

We may also employ a liquid hydrocarbon reaction medium comprising liquid olefins, e. g., n-hexenes, cyclohexene, 1-octene, hexadecenes and the like.

The normally solid polymerization products which are retained on the catalyst surface or grease-like ethylene polymers may themselves function to some extent as a liquefied hydrocarbon reaction medium but it is highly desirable to add a viscosity reducing hydrocarbon, such as those mentioned above, thereto in the reaction zone.

The liquid hydrocarbon reaction medium should be freed of poisons by acid treatment, e. g., with anhydrous p-toluenesulfonic acid, sulfuric acid, or by equivalent treatments, for example with aluminum halides or other Friedel-Crafts catalysts, maleic anhydride, calcium, calcium hydride, sodium or other alkali metals, alkali metal hydrides, lithium aluminum hydride, hydrogen and hydrogenation catalysts (hydrofining), filtration through a column of copper grains or 8th group metal, etc., or by combinations of such treatments.

We have purified C. P. xylenes by refluxing with a mixture of $MoO_3$-$Al_2O_3$ catalyst and $LiAlH_4$ (50 c. c. xylene—1 g. catalyst—0.2 g. $LiAlH_4$) at atmospheric pressure, followed by distillation of the xylenes. Still more effective purification of solvent can be achieved by heating it to about 225-250° C. with either sodium and hydrogen or NaH in a pressure vessel.

Temperature control during the course of the ethylene conversion process can be readily accomplished owing to the presence in the reaction zone of a large liquid mass having relatively high heat capacity. The liquid hydrocarbon reaction medium can be cooled by heat exchange inside or outside the reaction zone. It should be noted, however, that in some instances the solvent may be present as a dense gas phase.

When solvents such as xylenes are employed, some alkylation thereof by ethylene can occur under the reaction conditions. Propylene is a far more reactive alkylating agent than ethylene and when propylene is present in the feed it is desirable to employ a non-alkylatable solvent such as decalin. The alkylate is removed with grease in the present process, can be separated therefrom by fractional distillation and can, if desired, be returned to the polymerization zone.

An illustrative flow diagram indicating one method by which the process of our invention may be effected is set forth in the accompanying figure. The olefinic charging stock, ethylene or an ethylene-propylene mixture, is passed through compressor 10 wherein the pressure thereof is raised to a suitable value, for example, between about 500 and 2000 pounds, thence into chamber 11, which is provided with a suitable deoxygenating agent such as metallic copper at 150° C., then into chamber 12 which is provided with a dehydrating reagent such as adsorptive alumina, anhydrous calcium sulfate, silica gel or equivalent drying reagents. The dried charging stock is passed from chamber 12 into chamber 13 wherein carbon dioxide is removed from the charging stock. Chamber 13 is provided with a suitable reagent, for example, sodium hydroxide deposited upon asbestos or with any other efficacious decarbonating reagent. The charging stock may be dried further if necessary after leaving chamber 13. The charging stock thus purified usually contains less than 50 parts per million of oxygen and has a dew point below —45° C. The purified charging stock is passed into an absorber 14, wherein it meets a counterflow of solvent. Solvent or liquid reaction medium may be charged to the absorber and to the process by pump 15 through valved line 16 and heat exchanger 17, wherein it is brought to a suitable temperature for absorption, usually between about 15 and about 35° C. although higher or lower temperatures can be used; recycle solvent from line 61 may also be charged to the absorber or may be the sole absorption medium employed. In absorber 14 a solution containing between 2 and about 30 percent olefin, e. g. about 7 weight percent ethylene, is produced and is withdrawn through valved line 18 into a guard chamber 19 for final purification. The guard chamber may contain an active metal or metal hydride, for example, sodium or other alkali metal, an alkaline earth metal, an alkali metal hydride or an alkaline earth metal hydride. A preferred material for use in the guard chamber is calcium hydride. The guard chamber may be operated at temperatures between about 100° C. and about 280° C. If the feed stock is of sufficient purity, the guard chamber may be by-passed (by lines not shown) and introduced directly into reactor 25.

From guard chamber 19 the ethylene and solvent are discharged into line 20, thence through pump 21 into heater 22 wherein they are brought to the polymerization temperature, for example, between about 200 and about 275° C. From heater 22 the charge is passed through line 23, thence through line 24 into the lower end of reaction chamber 25. While a variety of suitable reactors can be employed, in the accompanying figure there is illustrated an autoclave divided into upper and lower sections by baffle 26. A stirring mechanism 27 projects into the lower portion of the reactor and suitable baffles 28 are provided at the walls. The stirring mechanism may be operated at about 20 to about 1000 R. P. M., e. g., about 650 R. P. M. It will be apparent, therefore, that a high degree of intermixing between the catalyst, alkali metal, olefinic material and liquid reaction medium is achieved in the lower portion of reactor 25. Reactor 25 may be initially charged with the group 6a metal oxide catalyst and alkali metal through lock hopper devices or equivalents, and further amounts of metal oxide catalyst and alkali metal can be added intermittently during the course of the reaction, as desired, by suitable means.

If desired, a portion of predried solvent can be passed through valved line 29 and heater 30, wherein it is brought to a temperature between about 150° C. and about 300° C., into a contacting chamber 31 provided with baffle 32, stirring mechanism 33 and an inlet 34 for alkali metal. An intimate dispersion or solution of alkali metal in solvent is formed in contactor 31 and is withdrawn from the upper, relatively quiescent zone of contactor 31 through valved line 35 into line 24 and is forced by pump 36 into reactor 25. An alternative and very useful method of purifying the solvent in contacting chamber 31 is to treat said solvent with an alkali metal hydride, usually NaH and a supported group 6a metal oxide, e. g. 10 weight percent $MoO_3$-gamma alumina, using about 3 to about 10 parts by weight of supported metal oxide per part by weight of alkali metal hydride, at a temperature between about 135 and about 270° C. and liquid hourly space velocities between about ½ and about 10.

In reactor 25, the polymerization of ethylene, or copolymerization of ethylene with other polymeric materials such as propylene, is effected at suitable temperatures and pressures. The usual concentration of ethylene in the solvent entering the reactor is about 10 weight percent and the effluent from the reactor is usually a 2-5 weight percent solution of solid polymer in the solvent. When the preparation of a homopolymer of ethylene having a melt viscosity in the range of about $2\times10^5$ to about $5\times10^6$ poises is desired, the preferred temperatures are between about 230° C. and about 275° C. The reaction period can be varied between about 10 and about 100 minutes.

It will be understood that instead of one reactor we may employ a number of reactors in parallel or in series. When reactors are employed in series, variations in temperature and pressure, olefin concentration in solvent, and catalyst concentration become possible so that more control can be exerted over the average molecular weight and molecular weight range of the product, as well as of the extent of conversion in each stage. Also, through the employment of a number of manifolded reactors, suitable by-pass lines and valves, it becomes possible to cut any reactor out of the system for purposes of cleaning and repair.

The upper portion of reactor 25 constitutes a quiescent settling zone wherein fine catalyst particles and alkali metal settle from the solution of polymer product in the reaction solvent and return under the force of gravity to the lower agitated portion of the reactor. The relatively clear solution of reaction products in solvent is withdrawn from the upper portion of reactor 25 through line 37 and expansion valve 38, wherein the pressure is allowed to fall to a value between about 15 and about 250 p. s. i. g. The product mixture discharge from valve 38 tangentially into a separator, e. g., cyclone-type separator 39, wherein a temperature of at least about 150° C. is maintained. Gas comprising a substantial proportion of ethylene in a poison-free condition is discharged from separator 39 through valved line 40. Hot solvent may be introduced into separator 39 through line 51 in order to prevent separation of polymer upon the walls of the separator. The solution of polymer in solvent (maximum of about 5 weight percent polymer) is withdrawn from separator 39 through valved line 41, into filter 42, wherein any fine catalyst particles which may have been carried along, are separated and withdrawn through valved line 43. If desired, the polymer solution may be subjected to the action of ultrasonic vibrators, which effect coagulation of the very fine catalyst particles so that they can be more readily filtered.

The solution of polymer product is withdrawn from filter 42 through line 44 into cooler 45, wherein its temperature is adjusted to a value between about 90° C. and about 20° C. and is then discharged through line 46 into filter 47. The solid polymer product is removed from filter 47 at 48 and the solvent or reaction medium is withdrawn through line 49, whence a portion can be discharged from the system through valved line 50, a portion can be passed through valved line 51, pump 52 and heater 53 into separator 39, and the remainder can be passed through valved line 54 into fractionator 55.

Precipitation of polymer from the solution in line 44 can be induced by the addition of antisolvents such as low-boiling hydrocarbons, e. g. propane, alcohols, ketones (acetone), etc. The polymeric product of the present process removed at 48 can be subjected to various treatments to prepare it for conversion to a finished industrial product. Thus, it may be subjected to various treatments to remove imbibed solvent, it may be shredded or extruded to form string-like particles, dried, etc.

In fractionator 55 the solvent or liquid reaction medium is vaporized and passes overhead through line 56, whence a portion may be removed from the system through valved line 57, but is preferably passed through valved line 58 into cooler 59, wherein its temperature is brought to a value between about 20° C. and about 80° C., whence it is passed into pump 60. Pump 60 forces the solvent through valved line 61 and heat exchanger 17 into absorber 14 to prepare a solution of fresh ethylene charging stock for the polymerization process. A portion of the solvent is also forced by pump 60 through valved line 62 into the upper portion of absorber 63. Recycled gases from separator 39 and line 40 are passed through valved line 64 and compressor 65 through line 66 into the lower portion of absorber 63, in which ethylene is selectively absorbed in the solvent to produce a solution having a concentration between about 2 and about 10 weight percent of ethylene, which is discharged from absorber 63 through valved line 67 into line 20, whence it is passed to reactor 25. Unabsorbed gases are discharged from absorber 63 through valved line 68.

Liquid reaction products boiling above the boiling range of the solvent medium can be discharged from fractionator 55 and the process through valved line 69 but are preferably passed through valved line 70 into a second fractionator 71. A by-product produced in relatively small volume in the present polymerization process, when an alkylatable aromatic hydrocarbon solvent such as a xylene is employed, is an alkylate produced by reaction of said alkylatable aromatic hydrocarbon and ethylene (or propylene, when that is employed as a component of the charging stock). The alkylated aromatic hydrocarbon products are vaporized and fractionated in tower 71, from which they are discharged through line 72. It is usually desirable to recycle at least a portion of the alkylate through valved line 73 to line 41 for employment as a solvent in filter 42. The remainder of the alkylate may be discharged from the process through valved line 74 or may be recycled for employment as part of the liquid reaction medium in reactor 25.

Relatively small proportions of low molecular weight grease-like ethylene polymers are produced in the polymerization process. The grease-like products are removed as a bottoms fraction from tower 71 through valved line 75.

An alternative method of operation following filtration of fine catalyst particles in filter 42 involves introduction of the dilute solution of ethylene polymers in the reaction solvent, e. g., benzene, into a tower containing hot water or a mixture of liquid water and steam at a temperature sufficient to flash distil the solvent (or an azeotrope of solvent and water) from the solution and to produce a water slurry of the solid polymer containing about 1 to about 5 weight percent polymer. The aqueous slurry of polymer can be concentrated by conventional methods to yield a slurry containing about 10 to 15 weight percent polymer, which can thereafter be centrifuged to yield a polymer containing a minor proportion of water, which can be thoroughly dried in conventional equipment. The solvent passing overhead in the flash distillation operation can be condensed, separated from a lower liquid layer of water, re-distilled to further dry it and finally can be thoroughly dried with desiccants, e. g. silica gel or alumina gel, prior to recycle to storage or to the polymerization reaction zone.

The following examples are presented for the purpose of illustrating but not unduly limiting the claimed invention. Unless otherwise indicated, the general procedure which was employed in batch operations was as follows. The catalyst was 20-35 mesh, 8 weight percent $MoO_3$ supported on gamma-alumina. The molybdena catalyst was pre-reduced unless otherwise indicated. Pre-reduction of the molybdena catalyst was carried out with dry hydrogen passing at atmospheric pressure through the catalyst at approximately 5 liters per hour per 1-10 g. of catalyst for 16 hours at 480° C. The reactions were carried out in a pressure vessel having a capacity of 100 cc., provided with a magnetically-operated stirring mechanism. The reactor was charged with 50 cc. of solvent and thereafter with the pre-reduced molybdena catalyst. When 100 cc. of solvent were employed, a 250 cc. autoclave was used. The gas space in the reactor was then blanketed with nitrogen. The alkali metal in particle form was then added to the reaction vessel, whereupon the head was fitted while maintaining a flow of nitrogen to keep the system free of air. When unreduced catalyst was charged to the reaction vessel, it was simply poured in without the use of nitrogen. Residual air was flushed from the reaction vessel while pressure testing with hydrogen. The final component, ethylene, was charged to the reaction vessel after the latter has been heated to the reaction temperature. The magnetically driven stirrup-type stirrer was alternatively lifted and plunged down through the solution at a rate sufficient to keep the catalyst in suspension. Ethylene was introduced from time to time during the course of the run in order to maintain the reaction pressure. A minor hydrogen partial pressure of the order of about 100-200 p. s. i. g. may be superimposed on the ethylene pressure when the reaction fails to start readily. By plotting cumulative pressure drop against cumulative time, the progress of a pressure run can be followed. In many cases much higher yields might have been obtained, had provisions been made for the inclusion of a larger proportion of solvent in the reaction zone, since one of the reasons for run termination was jamming of the stirring mechanism due to the fact that the high molecular weight polymer was produced in the reaction zone in an amount exceeding its solubility in the liquid reaction medium under the reaction conditions.

The important effects of our alkali metal promoters will be appreciated by bearing the following information in mind. In runs carried out

TABLE

| Example | Catalyst, g.[1] | Alkali Metal, g.[2] | T °C. | Pressure, p.s.i.g.[3] | Solvent, ml.[4] | Yield of Solid Polymer, g./g. of Solid Catalyst | $10^2 \times$ Specific Viscosity[5] | Melt Viscosity, Poises[6] | Film[7] | $10^4 \#$ Density of Solid Polymer | Remarks |
|---|---|---|---|---|---|---|---|---|---|---|---|
| 1 | 0.5 | 0.5 | 230 | 1,010 | 150X | 7.1 | Ins. | 6[7] | TF | 9,756-9,858 | |
| 2 | 1 | 0.5 | 230 | 1,000 | 140X | 6.66 | 41.9-58.8 | | TF | 9,650-9,900 | Initial amount of solvent. Multiple batch. Total solvent was 2,500 ml. |
| 3 | 0.1 | 0.1 | 230 | 1,000 | 50X | 6.7 | 64.6 | | TF | 9,673 | |
| 4 | 0.1 | 0.1 | 233 | 1,075 | 100X | 49.6 | | | TF | 9,615-9,776 | |
| 5 | 0.1 | 0.1 | 232 | 700/390 | 100X | 51.8 | 44.7-68.5 | | TF | 9,441-9,597 | |
| 6 | 0.5 | 0.2 | 230 | 500 | 100X | 8.6 | 69 | | TF | 9,570 | |
| 7 | 3.0 | 0.3 | 180 | 240/80 | 150X | 1.06 | Ins. | 1.2[8] | TF | 9,475 | |
| 8 | 1.0 | 0.1 | 277 | 990/100 | 50D | 5.85 | 19.3 | 2.4[5] | Sl. TF | 9,671 | |
| 9 | 1.0 | 0.1 | 255 | 960/100 | 100D | .6 | 25.3 | 3.7[6] | TF | 9,676 | |
| 10 | 1.0 | 0.1 | 325 | 950/110 | 100D | 7.3 | 4.1 | | B | | |
| 11 | 1.0 | 0.1 | 283 | 800/100 | 50X | 4.25 | 8.6 | 2.9[4] | B | 9,688 | |
| 12 | 1.0 | 0.1 | 275 | 620/440 | 50B | 7.0 | 38 | 7.9[6] | TF | 9,515 | |
| 13 | 1.0 | 0.1 | 276-282 | 500/560 | 50B | 4.6 | 13.5 | 1.33[5] | B | 9,695 | |
| 14 | 1.0 | 0.05 | 255 | 925/130 | 50X | 5.26 | 23.7 | 1.49[6] | TF | 9,634 | |
| 15 | 1.0 | 0.1 | 270 | 955/80 | 100T | 6.36 | 27.5 | 1.55[6] | TF | 9,643 | |
| 16 | 1.0 | 0.1 | 232 | 945/85 | 50X | 2.28 | 63 | 2.95[7] | TF | 9,538 | $H_2$-reduced 50% Molybdena-alumina. 5 cc. 2-ethyl-1-hexene added. |
| 17 | 1.0 | 0.1 | 232 | 925/100 | 95X | 4.38 | 50 | 1.05[7] | TF | 9,557 | 5 cc. of 2-methyl-2-butene added. |
| 18 | 1.0 | 0.1 | 233 | 850/160 | 45X | 4.02 | 62.4 | 1.23[7] | TF | 9,547 | |
| 19 | 1.0 | 0.1 | 230 | 895/100 | 100X | 8.51 | 29.8 | 3.9[7] | TF | 9,581 | $CoMoO_4$ catalyst. |
| 20 | 1.0 | 0.1 | 230 | 895/115 | 50X | 4.10 | 62.3 | 7.2[7] | TF | 9,998 | $H_2$ reduction of catalyst at 700° C. |
| 21 | 1.0 | 0.1 | 100-199 | 390-800/10-75 | 50D | 0.08 | | | | | Propylene feed. $CoMoO_4$ catalyst. |
| 22 | 3.0 | 1.0 | 256 | 920 | 100X | 2.41 | 22 | 6.8[5] | TF | 9,670 | Bomb heated to reaction temp./1,000 lbs. $H_2$ for 1 hr. |
| 23 | 0.5 | 0.2Li | 253 | 870 | 100X | 29.8 | 12.6 | 6.5[4] | Sl. T & F | 9,651 | |
| 24 | 1.0 | 0.1K | 254 | 830 | 100X | 1.96 | 16.2 | 5.8[5] | TF | 9,739 | |
| 25 | 0.1 | 0.32 | 230 | 600 | 50B | 30.0 | | 3.2[6] | | | |
| 26 | 0.1 | 0.64 | 230 | 600 | 50B | 21 | | 3.2[6] | | | |
| 27 | 5.0 | 0.6 | 200 | 600 | 30D | 0.62 | 41.6 | 6.6[6] | TF | 9,440 | 30 cc. of 2-butene added. |
| 28 | 2.0 (W) | 0.5 | 150-203 | 1,025 | 50D | 1.45 | 113.0 | 1.8[8] | TF | 9,377 | 20 cc. of 2-butene added. |
| 29 | 2.0 (W) | 0.5 | 148 | 440/500 | 30D | 0.34 | 113.6 | | | 9,381 | Propylene added. $CH_2/CH_3=22$. |
| 30 | 5.0 (Cr) | 0.5 | 233 | 950 | 50X | 0.26 | | 1.3[5] | | | Catalyst reduced in $H_2$ at 375° C. |

[1] Cr represents a chromia-alumina catalyst containing 31 w. percent chromia; W represents a tungstia catalyst having the composition 20 w. percent $WO_3$-80 w. percent $ZrO_2$.
[2] Sodium metal unless otherwise indicated.
[3] When only one pressure is given, it is the initial partial pressure of ethylene. When two pressures are given, the right-hand pressure figure is the initial partial pressure of hydrogen.
[4] X represents xylenes, B represents benzenes, D represents decalin, T represents tetralin.
[5] The specific viscosity is (relative viscosity −1) and relative viscosity is the ratio of the time of efflux of a solution of 0.125 g. polymer in 100 cc. C. P. xylenes at 110° C. from the viscosimeter as compared with the time of efflux of 100 cc. C. P. xylenes at 110° C.
[6] As determined by the method of Dienes and Klemm, J. Appl. Phys. 17, 458-71 (1946). The superscript refers to the exponent of 10 times the number given.
[7] TF means tough and flexible; B means brittle; Sl. means slightly.

without any promoters, employing the general operating procedure above described, employing the 8 weight percent pre-reduced molybdena-gamma-alumina catalyst and a C. P. xylenes: catalyst ratio (ml./g) of 5, only 0.5 g. per g. of catalyst of solid ethylene polymer were obtained at 230° C. and 1000 p. s. i. g. initial ethylene pressure.

Alkali metal promoters permit the employment of very high solvent:catalyst ratios while maintaining relatively high polymerization rates, which in turn permits continuous processing and long catalyst life and also results in the production of much higher solid polyethylene yields per weight of metal oxide catalyst which is employed.

Although the results of the various examples are usually self-evident, a brief interpretation of the various examples and some comparisons are supplied hereinafter.

The higher yields of polyethylene shown in some of the examples have and can be reproduced at will. Other examples showing lower yields are nonetheless introduced to illustrate particular facets of the invention, although it will be apparent that in such instances the necessary routine adjustments were usually not made to obtain the highest possible polymer yields. From the industrial viewpoint, the processes herein described can be readily operated to produce at least 50 parts by weight of solid polyethylene per part by weight of metal oxide catalyst.

In Example 4, it will be noted that the employment of carefully purified xylenes, even at the extremely high ratio of 1000 ml. per g. of catalyst, resulted in a very large yield of polymer which could be formed into a tough and flexible film. The product was fractionated to produce one polymer having a melt viscosity of $5.6 \times 10^7$ poises and specific viscosity $\times 10^5$ of 98,600 and a second polymer having a melt viscosity of $4.0 \times 10^8$ poises.

For comparison with Example 4, reference may be had to Examples 1 and 2, wherein the solvent:catalyst ratios (ml./g.) were, respectively 300 and 2500.

A variety of solvents were employed in effecting the polymerizations whose results are tabulated. Thus, xylene was employed in many examples, for example, 4 and 5. Benzene was employed, for example, in Examples 12, 13, 25 and 26. Decalin was employed in a series of examples (8, 9 and 10) at ascending temperatures, and in other examples (21, 27, 28 and 29). Tetralin was employed as the liquid reaction medium in Example 15.

The sodium:catalyst weight ratio was varied in a number of successful examples, being 0.05 in Example 14, 0.33 in Example 22, 0.1 in many examples (for example, 15 and 19), 0.5 in Example 2, and 1.0 in Examples 1, 4, 5 and other examples. Good yields of solid polymer (30 g. and 21 g., respectively, per g. of metal oxide catalyst) were obtained in Examples 25 and 26 wherein the Na:metal oxide were 3.2 and 6.4.

In Example 17, 5 cc. of 2-ethylhexene was employed and it will be noted that the polymer was characterized by high specific and melt viscosities and the production of a tough, flexible film. Similar results were obtained in Example 18 wherein 5 cc. of 2-methyl-butene were added during the course of the run.

The copolymerization of ethylene with propylene is illustrated in Example 29, wherein the catalyst was 20 w. percent tungstia on zirconia reduced by hydogen at 450° C. The polymer was soft and rubbery and did not melt even at 300° C. The same catalyst was employed in Example 28 to produce a tough, flexible polymer from ethylene and 2-butene. In Example 27, the data were obtained from the copolymerization of ethylene with 2-butene in decalin in the presence of 8 w. percent molybdena-alumina filter cake which had been prereduced with hydrogen at 480° C. and atmospheric pressure.

An example of propylene polymerization is given in Example 21, wherein a cobalt molybdate catalyst was employed. It will be noted from the yield of soil polymer that propylene polymerizes at a much slower rate than ethylene in the present process.

In Example 16, a 50 weight percent prereduced molybdena catalyst on a gamma-alumina support was employed for ethylene polymerization and a cobalt molybdate catalyst was, likewise, successfully employed in Example 19. Tungstia catalysts were employed in Examples 28 and 29 and chromia in Example 30.

Metallic lithium was shown to be an active promoter in ethylene polymerization in Example 23. Potassium also proved to be a satisfactory promoter (Example 24), when employed in a small ratio relative to molybdena-alumina.

While most of the examples were effected at about 230° C., much lower temperatures were studied, as will be noted from Examples 7 and 21, and also higher temperatures, as will be noted from Examples 13 and 10. In general, raising the reaction temperature while maintaining the other reaction variables constant tends somewhat to reduce the specific viscosity of the solid polymer (compare Examples 9, 8 and 10), while lowering the reaction temperature from the optimum value in a given case reduces the rate of polymerization.

In Example 20 a relatively high temperature was employed in reducing the molybdena-alumina catalyst (700° C.).

The addition of hydrogen to the reactor is shown in numerous examples.

Example 2 was a multiple-batch operation rather than a strictly batch operation, the catalyst being maintained within the reactor while a solution of product in xylenes was withdrawn from time to time and replaced by a solution of ethylene in xylenes. Before completion of this example, about 2500 ml. of solvent had been contacted with the same charge of catalyst.

*Example 31*

Our process has been successfully practiced also in continuous operation, employing a 1-liter stirred autoclave of the design shown in the appended figure. In the flow operation, a 9 w. percent solution of ethylene in benzene was passed through a guard reactor containing calcium hydride at 199° C., thence into the stirred autoclave containing 35 g. of 8 w. percent pre-reduced molybdena-gamma alumina and 16 g. of sodium. The reaction temperature was 243° C., the pressure was 1600 p. s. i. g., the sodium:catalyst weight ratio was 0.46 and the on-stream period was 15 hours. The ethylene conversion to solid polymer was 10.9 g. per g. of catalyst. The total products that were produced were 381 g. of solid ethylene polymer, 7.7 g. of a grease-like ethylene polymer and 4.2 g. of benzene alkylation products, representing 97.9 weight percent ethylene conversion to solid polymer. The percentage conversion, based on ethylene used, was 36.2. The solid polyethylene had a melt viscosity of $2.28 \times 10^6$ poises.

We may employ group 5a metal oxide catalysts in lieu of the group 6a metal oxides in our process, viz., oxides of vanadium, columbium and tantalum, the process remaining otherwise unchanged in all essential regards.

The polymers produced by the process of this invention can be subjected to such after-treatment as may be desired, to fit them for particular uses or to impart desired properties. Thus, the polymers can be extruded, mechanically milled, filmed or cast or converted to sponges or latices. Antioxidants, stabilizers, fillers, extenders, plasticizers, pigments, insecticides, fungicides, etc. can be incorporated in the polyethylenes and/or in by-product alkylates or "greases." The polyethylenes may be employed as coating materials, binders, etc. to an even wider extent than polyethylenes made by prior processes.

The polymers produced by the process of the present invention, especially the polymers having high specific viscosities, can be blended with the lower molecular weight polyethylenes to impart stiffness or flexibility or other desired properties thereto. The solid resinous products produced by the process of the present invention can, likewise, be blended in any desired proportions with hydrocarbon oils, waxes such as paraffin or petrolatum waxes, with ester waxes, with high molecular weight polybutylenes, and with other organic materials. Small proportions between about .01 and about 1 percent of the various polymers of ethylene produced by the process of the present invention can be dissolved or dispersed in hydrocarbon lubricating oils to increase V. I. and to decrease oil consumption when the compounded oils are employed in motors; larger amounts of polyethylenes may be compounded with oils of various kinds and for various purposes.

The products having a molecular weight of 50,000 or more produced by the present invention, can be employed in small proportions to substantially increase the viscosity of fluent liquid hydrocarbon oils and as gelling agents for such oils. The solution of about 1 gram of an ethylene polymer produced by this invention, having a specific viscosity $\times 10^5$ of about 50,000 in about one liter of xylenes at a temperature close to the boiling point produces an extremely viscous solution.

The polymers produced by the present process can be subjected to chemical modifying treatments, such as halogenation, halogenation followed by dehalogenation, sulfohalogenation, e. g., by treatment with sulfuryl chloride, sulfonation, and other reactions to which hydrocarbons may be subjected.

Having thus described our invention, what we claim is:

1. In a process for the production of a normally solid hydrocarbon material, the steps which comprise contacting a normally gaseous olefin selected from the class consisting of ethylene, propylene and mixtures containing ethylene and propylene with an alkali metal and an oxide of a metal of Group 6a of the Mendeleef Periodic Table at a reaction temperature between about 75° C. and about 325° C., and separating a normally solid hydrocarbon material thus produced.

2. The process of claim 1 wherein said oxide is partially pre-reduced before use.

3. The process of claim 1 which comprises introducing a minor proportion of hydrogen based upon said olefin, before substantial polymerization of said olefin has been effected, in order to initiate rapid and substantial polymerization of said olefin.

4. In a process for the production of a normally solid hydrocarbon material, the steps which comprise contacting ethylene with an alkali metal and an oxide of a metal of Group 6a of the Mendeleef Periodic Table in the presence of a liquid hydrocarbon reaction medium at a reaction temperature between about 75° C. and about 325° C., and separating a normally solid hydrocarbon material thus produced.

5. The process of claim 4 wherein said oxide is partially pre-reduced before use.

6. The process of claim 4 wherein said liquid hydrocarbon reaction medium is a saturated hydrocarbon.

7. The process of claim 4 wherein said liquid hydrocarbon reaction medium is a monocyclic aromatic hydrocarbon.

8. In a process for the production of a normally solid hydrocarbon material, the steps which comprise contacting ethylene with an alkali metal and an oxide of a metal selected from the group consisting of chromium, molybdenum and tungsten in the presence of a liquid hydrocarbon reaction medium at a reaction temperature between about 75° C. and about 325° C., and separating a normally solid hydrocarbon material thus produced.

9. In a process for the production of a normally solid, resinous hydrocarbon material, the steps which comprise contacting ethylene in a concentration between about 2 weight percent and about 10 weight percent in a liquid hydrocarbon reaction medium with an alkali metal and an oxide of metal of Group 6a of the Mendeleef Periodic Table at a reaction temperature between about 230° C. and about 275° C. and a reaction pressure of at least about 200 p. s. i. g., and separating a normally solid, resinous hydrocarbon material thus produced.

10. The process of claim 9 wherein said oxide is partially pre-reduced before use.

11. In a process for the production of a normally solid, resinous hydrocarbon material, the steps which comprise contacting ethylene in a concentration between about 2 weight percent and about 10 weight percent in a liquid hydrocarbon reaction medium with an alkali metal and a minor proportion of an oxide of a metal selected from the group consisting of chromium, molybdenum and tungsten supported upon a mapor proportion of a difficultly reducible metal oxide, at a reaction temperature between about 230° C. and about 275° C. and a reaction pressure between about 200 and about 1000 p. s. i. g., and separating a normally solid, resinous hydrocarbon material thus produced.

12. The process of claim 11 wherein the alkali metal is sodium, the liquid reaction medium is an aromatic hydrocarbon, the metal oxide is a pre-reduced molybdenum oxide and the ratio of sodium to molybdenum oxide is between about 0.001 and about 10.

13. The process of claim 11 wherein the alkali metal is sodium, the liquid reaction medium is benzene and the metal oxide is a pre-reduced molybdenum oxide supported by gamma-alumina.

14. The process of claim 11 wherein the alkali metal is lithium, the liquid reaction medium is benzene and the metal oxide is a pre-reduced molybdenum oxide supported by gamma-alumina.

15. A process for the preparation of a tough, resinous, normally solid polymer, which process comprises contacting ethylene in a concentration of at least about 2 weight percent but not more than about 10 weight percent in a liquid hydrocarbon reaction medium with sodium and a catalyst comprising a major proportion of a difficultly reducible metal oxide and a minor proportion of a partially pre-reduced molybdenum oxide having an average valence state between about 2 and about 5.5 at a reaction temperature between about 130° C. and about 260° C. and a reaction pressure between about 200 and about 5000 p. s. i. g., and separating a solid polymer thus produced.

16. The process of claim 15 wherein said liquid hydrocarbon reaction medium is benzene, said molybdenum oxide is supported upon gamma-alumina and the sodium:molybdenum catalyst ratio is between about 0.001 and about 10, by weight.

17. A process for the preparation of a resinous copolymer from ethylene and propylene, which process comprises simultaneously contacting ethylene and propylene with a liquid hydrocarbon reaction medium, an alkali metal and a catalyst comprising a major proportion of a difficultly reducible metal oxide and a minor proportion of partially pre-reduced trioxide of a metal of Group 6a of the Mendeleef Periodic Table at a reaction temperature between about 75° C. and about 325° C., and separating a normally solid polymerization product thus produced.

18. The process of claim 17 wherein the Group 6a metal oxide is molybdena.

19. A process for the preparation of a tough, resinous, hydrocarbonaceous material from ethylene and propylene, which process comprises simultaneously contacting ethylene and propylene with decalin, sodium, a gamma-alumina supported, partially pre-reduced molybdenum trioxide having an average valence state between about 2 and about 5.5, the weight ratio of said sodium to said supported molybdenum trioxide being between about 0.001 and about 10, at a reaction temperature between about 75° C. and about 325° C., and separating a tough, resinous, hydrocarbonaceous material thus produced.

20. In a process for the production of a normally solid hydrocarbon material, the steps which comprise contacting ethylene with an alkali metal and an oxide of chromium in the presence of a liquid hydrocarbon reaction medium at a reaction temperature between about 75° C. and about 325° C., and separating a normally solid hydrocarbon material thus produced.

21. In a process for the production of a normally solid hydrocarbon material, the steps which comprise contacting ethylene with an alkali metal and an oxide of molybdenum in the presence of a liquid hydrocarbon reaction medium at a reaction temperature between about 75° C. and about 325° C., and separating a normally solid hydrocarbon material thus produced.

22. In a process for the production of a normally solid hydrocarbon material, the steps which comprise contacting ethylene with an alkali metal and an oxide of tungsten in the presence of a liquid hydrocarbon reaction medium at a reaction temperature between about 75° C. and about 325° C., and separating a normally solid hydrocarbon material thus produced.

23. In a process for the production of a normally solid hydrocarbon material, the steps which comprise contacting ethylene and a liquid hydrocarbon reaction medium with an alkali metal and a minor proportion of an oxide of chromium supported upon a major proportion of a difficultly reducible metal oxide at a reaction temperature between about 75° C. and about 325° C., and separating a normally solid hydrocarbon material thus produced.

24. The process of claim 23 wherein the oxide catalyst is partially prereduced before use.

25. In a process for the production of a normally solid hydrocarbon material, the steps which comprise contacting ethylene and a liquid hydrocarbon reaction medium with an alkali metal and a minor proportion of an oxide of molybdenum supported upon a major proportion of a difficultly reducible metal oxide at a reaction temperature between about 75° and about 325° C., and separating a normally solid hydrocarbon material thus produced.

26. The process of claim 25 wherein the oxide catalyst is partially prereduced before use.

27. In a process for the production of a normally solid hydrocarbon material, the steps which comprise contacting ethylene and a liquid hydrocarbon reaction medium with an alkali metal and a minor proportion of an oxide of tungsten supported upon a major proportion of a difficultly reducible metal oxide at a reaction temperature between about 75° C. and about 325° C., and separating a normally solid hydrocarbon material thus produced.

28. The process of claim 27 wherein the oxide catalyst is partially prereduced before use.

29. In a process for the production of a normally solid hydrocarbon material, the steps which comprise contacting propylene with an alkali metal and an oxide of a metal of Group 6a of the Mendeleef Periodic Table at a reaction temperature between about 75° C. and about 325° C., and separating a normally solid hydrocarbon material thus produced.

No references cited.